Feb. 23, 1954 C. I. JOHNSEN 2,669,974
APPARATUS FOR TREATING GASEOUS AND FLUIDIZED POWDER STREAMS
Filed Dec. 23, 1947 8 Sheets-Sheet 1
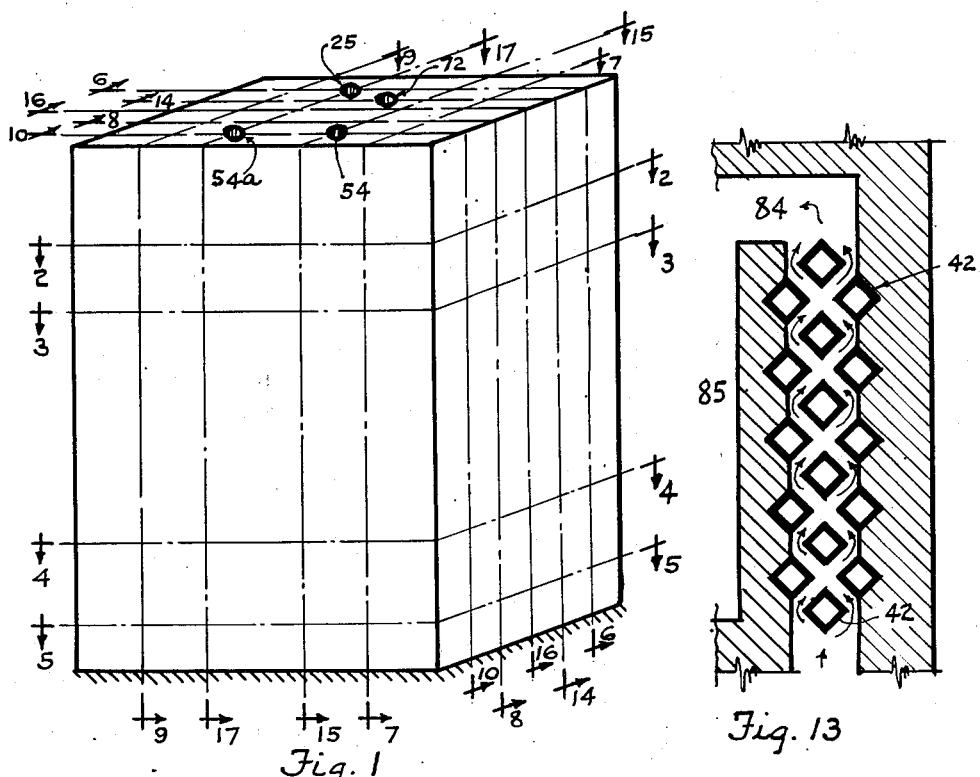
Fig. 1
Fig. 13
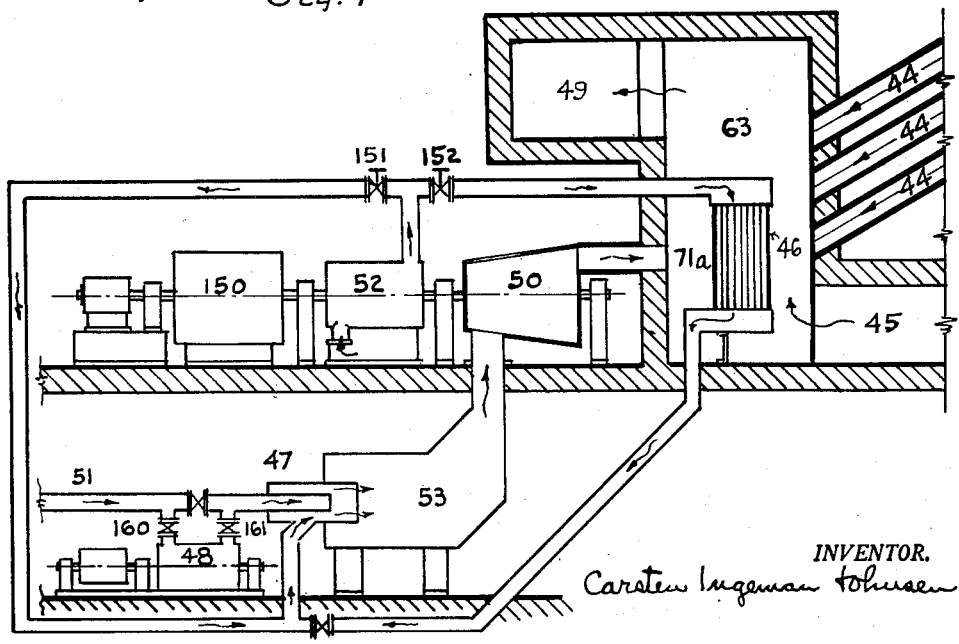
Fig. 18
INVENTOR.
Carsten Ingeman Johnsen

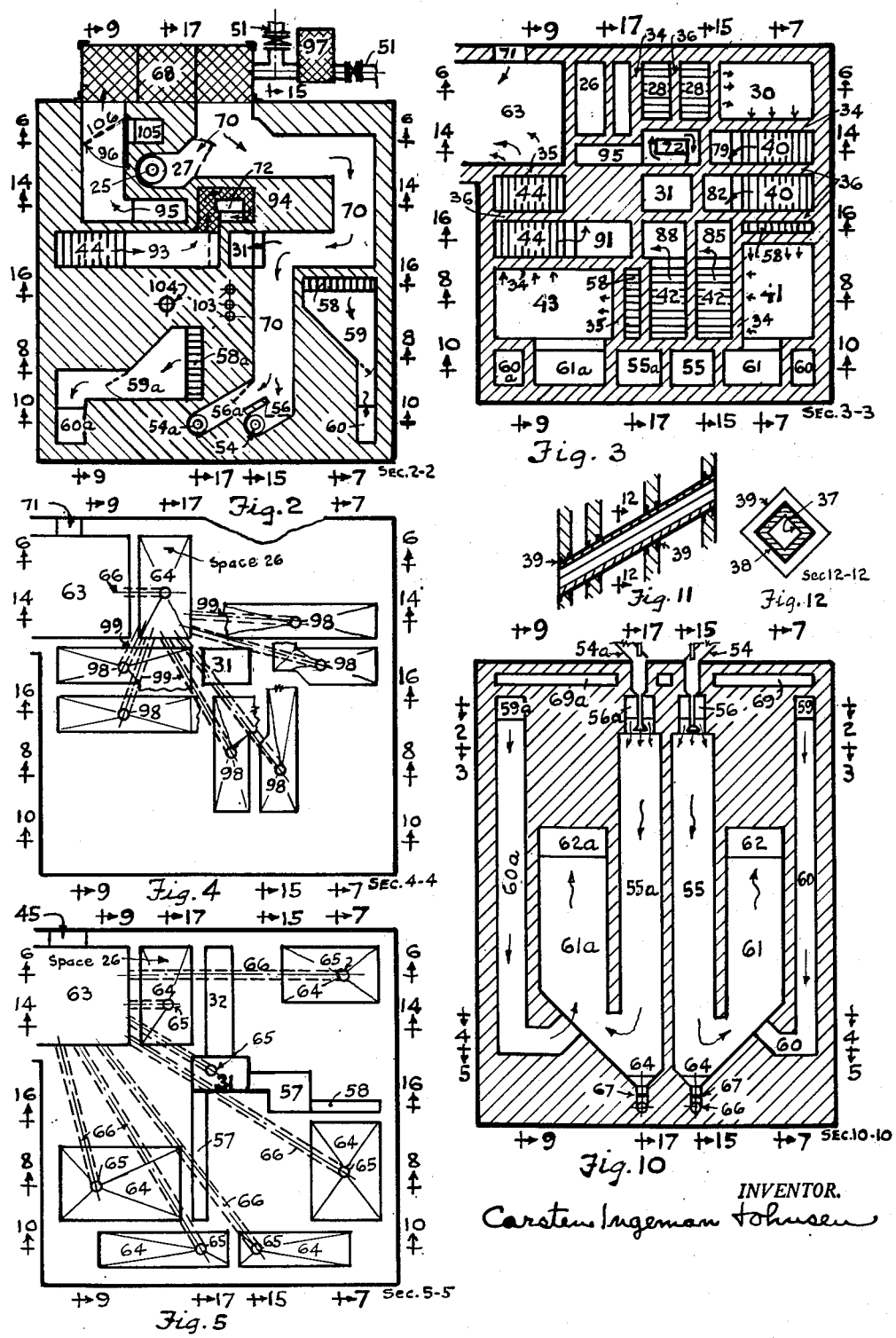

Feb. 23, 1954  C. I. JOHNSEN  2,669,974
APPARATUS FOR TREATING GASEOUS AND FLUIDIZED POWDER STREAMS
Filed Dec. 23, 1947  8 Sheets-Sheet 4

INVENTOR.
Carsten Ingeman Johnsen

Feb. 23, 1954   C. I. JOHNSEN   2,669,974
APPARATUS FOR TREATING GASEOUS AND FLUIDIZED POWDER STREAMS
Filed Dec. 23, 1947   8 Sheets-Sheet 6

Carsten Ingeman Johnsen   INVENTOR.

Feb. 23, 1954 C. I. JOHNSEN 2,669,974
APPARATUS FOR TREATING GASEOUS AND FLUIDIZED POWDER STREAMS
Filed Dec. 23, 1947 8 Sheets-Sheet 8

INVENTOR.
Carsten Ingeman Johnsen

Patented Feb. 23, 1954

2,669,974

UNITED STATES PATENT OFFICE 2,669,974

APPARATUS FOR TREATING GASEOUS AND FLUIDIZED POWDER STREAMS

Carsten Ingeman Johnsen, Floral Park, N. Y.

Application December 23, 1947, Serial No. 793,396

16 Claims. (Cl. 122—4)

My invention relates to the treatment of gases and of gaseous streams into which have been entrained small particles of solids or liquids and to the apparatus for such treatment.

There are a number of industries in which my invention is of great value and a number of modes of employment in which it can be used effectively. Among these uses are the treatment of industrial gases for the removal of smoke and ashes, the separation of isotopes through the use of selective diffusion barriers and the production of water gas or producer gas from pulverized coal. Many other uses will occur to those skilled in pertinent arts.

In all of the above industries an darts difficulties have been encountered in providing means to sustain the movement of gaseous streams, as well as in efficiently transferring heat to and separating solids from these streams. It is for such problems that my invention provides a solution.

Characteristic of my novel method is a treatment of gaseous streams which comprises leading the gaseous or fluidized powder stream through a series of units, each unit being a heated chamber through which the stream is caused to pass upwardly and a cooler chamber, through which cooler chamber the stream is caused to flow downwardly.

In this way, by the arrangement of a heated upward channel followed by a cooler downward channel, convection currents are set up which carry along the stream with a minimum of expense and bother. Also the same arrangement causes the precipitation of solid particles of a certain size and weight by the combined effects of gravity, an abrupt change in direction, and cooling of the entraining medium. A method of heating the hot chambers by means of internally heated tubes, while not essential to my invention, gives a more efficient heat transfer and is highly desirable.

In the drawings:

Figure 1 is an isometric projection of the enclosure containing my novel apparatus when used to make water gas, the view showing merely the sectional or cutting planes on which Figs. 2 to 17 are taken.

Figure 2 is a horizontal sectional view taken near the top of the apparatus on the line 2—2 of Fig. 1 showing preheated air ducts, part of the path of the newly made fuel gas, the air preheater unit, and the fuel and air entry points.

Figure 3 is a horizontal sectional view taken below Fig. 2 on the line 3—3 of Fig. 1 showing the upper parts of the apparatus.

Figure 4 is a horizontal sectional view taken near the bottom of the enclosure on line 4—4 of Fig. 1 showing the hoppers for collecting precipitated particles from the chambers of the processing zone.

Figure 5 is a horizontal sectional view taken a little below Fig. 4 on the line 5—5 of Fig. 1 showing the hoppers for collecting precipitated particles from elements of heating zone.

Figure 6 is a vertical sectional view taken on the line 6—6 of Fig. 1 showing portions of the path of combustion gases in the heating zone, the mixing chamber, the preheated air passages.

Figure 7 is a vertical sectional view taken at right angles to Fig. 6 on the line 7—7 of Fig. 1 showing additional parts of the heating zone.

Figure 8 is a vertical sectional view taken on a plane parallel to Fig. 6 on the line 8—8 of Fig. 1 showing additional elements of the heating and processing zones.

Figure 9 is a vertical sectional view taken on a plane parallel to Fig. 7 on the line 9—9 of Fig. 1 showing further elements of the heating and processing zones as well as the mixing chamber.

Figure 10 is a vertical sectional view taken on a plane parallel to Figs. 6 and 8 on the line 10—10 of Fig. 1 showing essential elements of the reaction heat section.

Figure 11 is an enlarged view in section of a gas generator tube.

Figure 12 is a view in cross-section of the tube shown by Fig. 11, the section being taken on the line 12—12 of Fig. 11.

Figure 13 is an enlarged view of a typical vertical section showing a preferred wall construction at tubes to achieve more uniform heat distribution.

Figure 14 is a vertical section similar to Figs. 2 to 10 taken on the line 14—14 of Fig. 1 showing elements of the processing zone together with typical means for discharging precipitated particles into the primary combustion chamber.

Figure 15 is a vertical sectional view taken at right angles to Fig. 14 on the line 15—15 showing elements of both the processing and heating zones as well as a fragmental view of the preheated air passage 31.

Figure 16 is a vertical sectional view taken in a plane parallel to Fig. 14 on the line 16—16 showing elements of both the processing and heating zones.

Figure 17 is a vertical sectional view taken in a plane parallel to Fig. 15 on the line 17—17 showing additional elements of both processing and heating zones including primary combustion chamber.

Figure 18 is a key plan or diagram showing how various units of a gas turbine installation may be advantageously combined with this embodiment of the invention and elements of a steam boiler.

Figure 20:
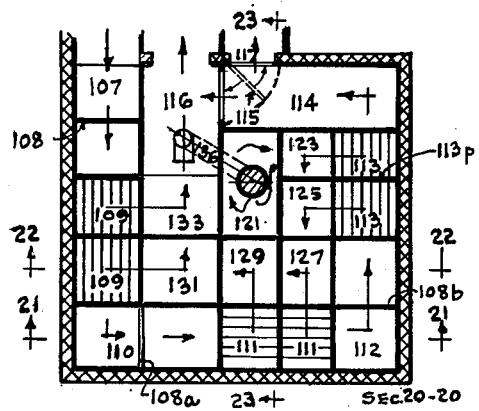
Figure 20 is a horizontal sectional view of a water gas producer designed to operate on counterflow taken on line 20—20 of Fig. 21 showing in plan the upper ports, the connecting contiguous ports, the partitioned tube nest portions, and the directions of flow. This view corresponds approximately to Fig. 3 taken on line 3—3 of Fig. 1, but is adapted to illustrate counterflow operation.
Figure 22:
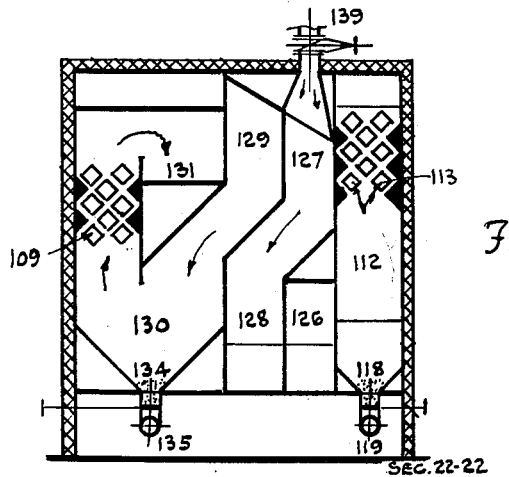

Figure 22 is a vertical section of the counterflow apparatus taken on line 22—22 of Fig. 20 showing a part of the path traveled by gases undergoing processing in a counterflow apparatus as well as the downward ducts 127 and 129.

Figure 23:
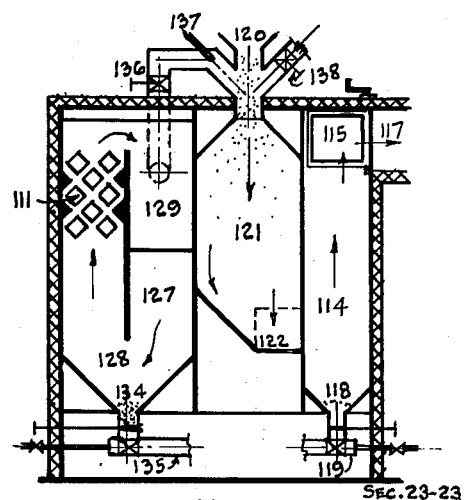

Figure 23 is a vertical sectional view taken on line 23—23 of Fig. 20 showing elements of the processing and heating zones including a section through the initial mixing chamber.

Figure 24:
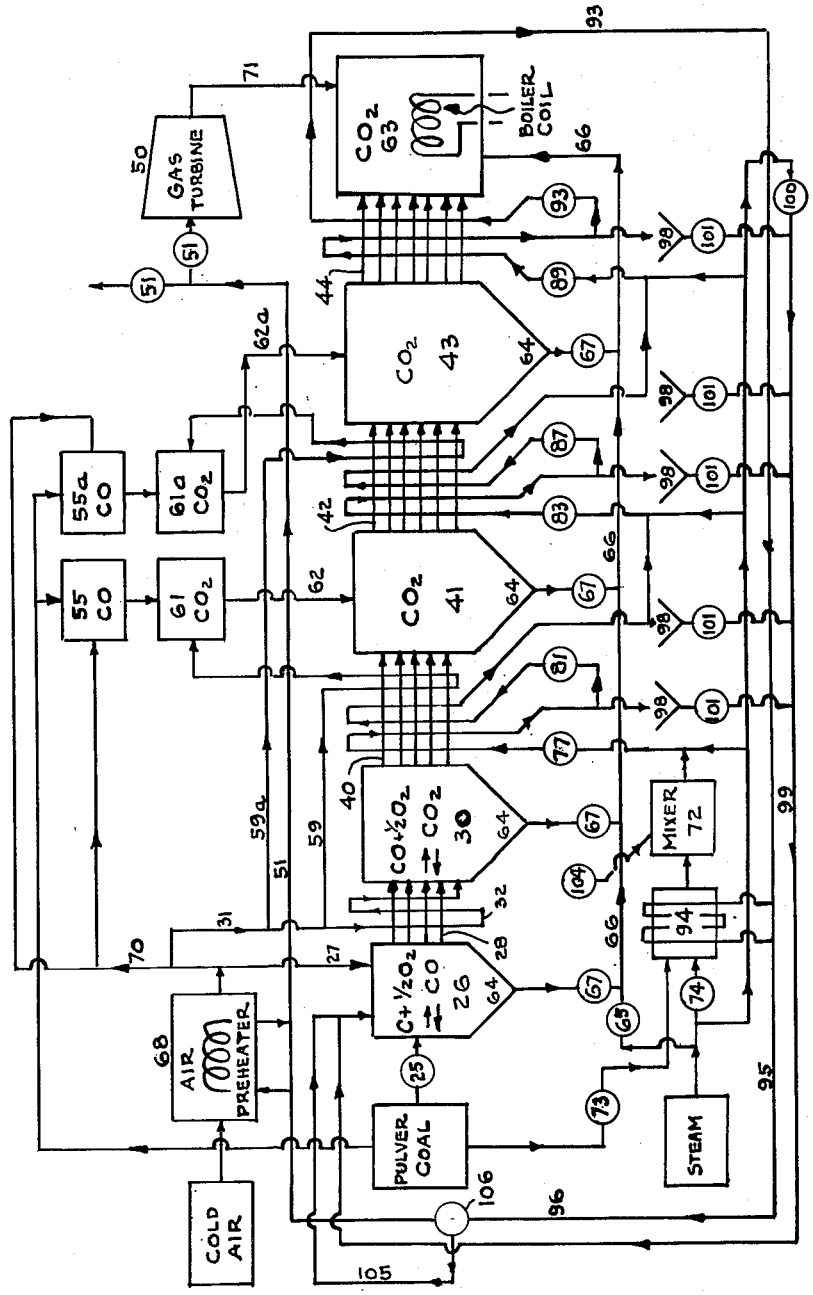

Figure 24 is a flow diagram of my invention as used in making water gas.

Figure 25:
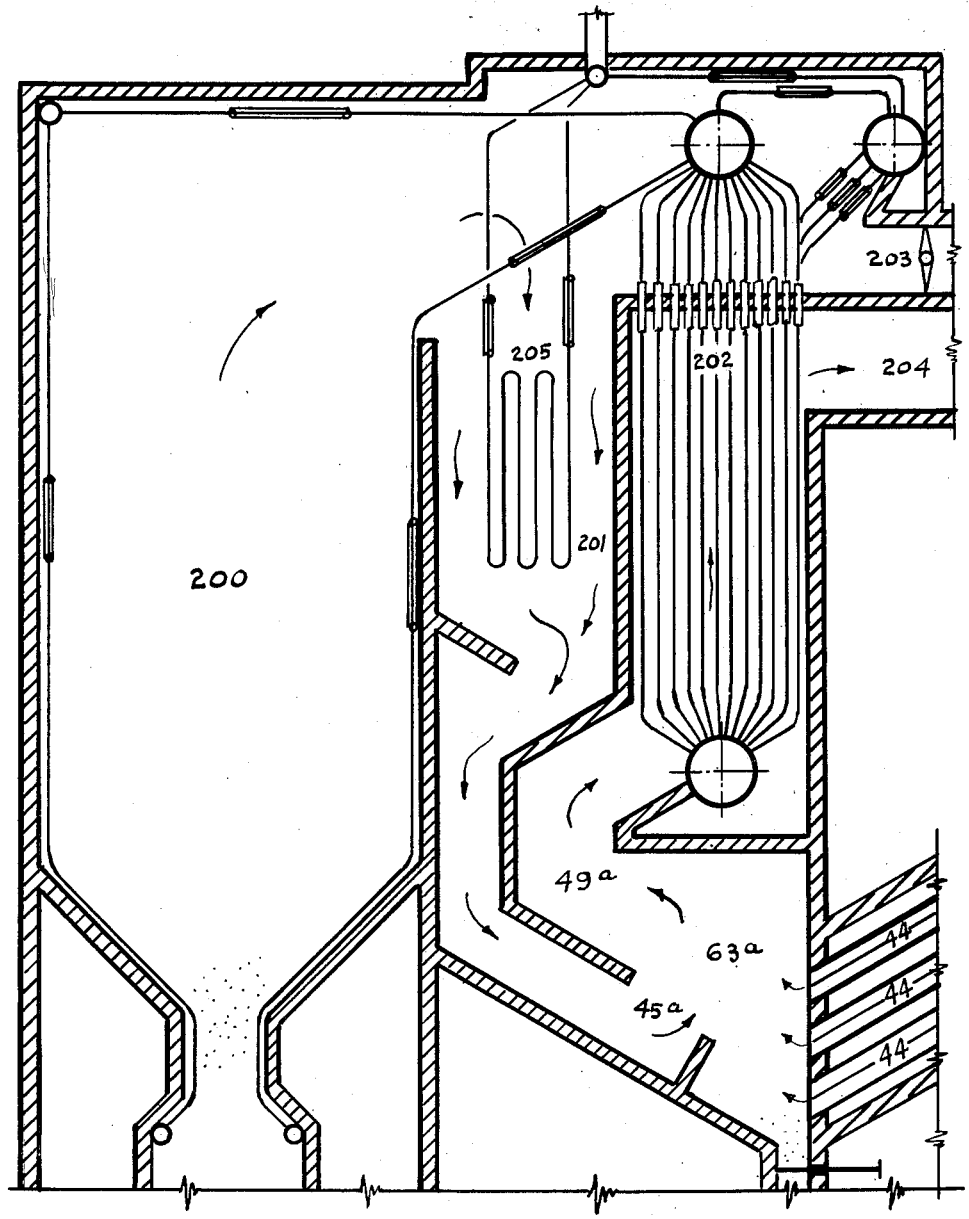

Figure 25 is a diagrammatic sectional view of the invention as used with a steam boiler wherein one section is heated by boiler combustion chamber gases and another section is heated by those gases after they are mixed with additional hot gases from my process and apparatus as described in connection with the preceding figures.

The method for the generation of fuel gas herein disclosed contemplates a system having two separate streams of flow which for convenience will be called the heating zone or enclosure and the processing zone or enclosure. In the heating zone, powdered coal and air are burned. In the processing zone powdered coal and steam, preheated to a suitable temperature, are reacted to form water gas. The hot gases resulting from combustion in the heating zone are used, first, to raise the powdered coal and steam of the processing zone to the optimum temperature for the water gas reaction, and then, to provide at this high temperature the heat of reaction necessary for the conversion of these processing zone ingredients.

A general flow pattern is laid out in Fig. 24. The heating zone, as shown in this figure, may be divided into two subsections. The first I call the sensible heat section, because the heat generated in that section is used in raising the temperature of the processing zone ingredients. This first section includes parts 26, 28, 30, 40 and 41 in Fig. 24. The second section of the heating zone I call the reaction-heat section, because the heat generated in this portion goes primarily toward adding to the ingredients that are within the hot processing zone the heat of reaction demanded by the endothermic water gas conversion. This reaction-heat section includes in Fig. 24 parts 55, 55a, 61, 61a, 62, 62a, 41 and 43. In the chambers 41 and 43 the contents of the sensible heat and reaction heat sections merge. Thereafter the merged contents pass on through and finally leave the heating zone as a common product.

In Fig. 24 it may be seen that powdered coal and air are led into the chamber 26 of the heating zone. Here they burn to carbon monoxide which is led out through a set of parallel tubes 28 (the details of which are hereinafter set forth in detail) into a second chamber 30, where the oxidation is completed with the production of carbon dioxide. This $CO_2$ in turn is led through another set of tubes 40 to the chamber 41.

Meanwhile other powdered coal and preheated air have been introduced into a pair of duplicate chambers 55 and 55a where they combine to form carbon monoxide (similarly to chamber 26). From chambers 55 and 55a the monoxide gases move separately into another pair of chambers 61 and 61a wherein additional preheated air is introduced and the carbon monoxide is in turn burned to carbon dioxide, as was done in chamber 30. This hot carbon dioxide passes through ducts 62 and 62a into chambers 41 and 43 where it joins the $CO_2$ gas which has concurrently been produced in the sensible heat section, as described in the preceding paragraph.

The combined gases in chamber 41 move through a series of parallel tubes 42 to the chamber 43 and thence through another similar series of tubes 44 to the chamber 63. From there, after surrendering most of their remaining heat to a steam boiler, they are allowed to pass to the atmosphere.

Thus in the heating zone, hot gases from two different sources are directed through a series of tubes and chambers to final disposal. It remains to describe the path through which the processing zone ingredients are led, enabling them to absorb the heat from the heating zone.

In the processing zone a mixture of steam, powdered coal and recycled water gas (this recycled gas being obtained as hereinafter described) is mixed thoroughly in chamber 72 and then made to pass twice among the tubes 40 of the heating zone. The structure by which this is accomplished is hereinafter described in detail. Having made its two passes through the tubes 40, the processing zone ingredients are now at the proper temperature for the water gas reaction to occur. They move to the tubes 42 of the heating zone and make two passes among them moving therefrom to contact the tubes 44. In passing among these groups of tubes 42 and 44 which will have lately received a fresh supply of heat from the reaction heat section, the processing zone ingredients pick up enough heat to enable the endothermic water gas reaction to occur.

Figure 19:
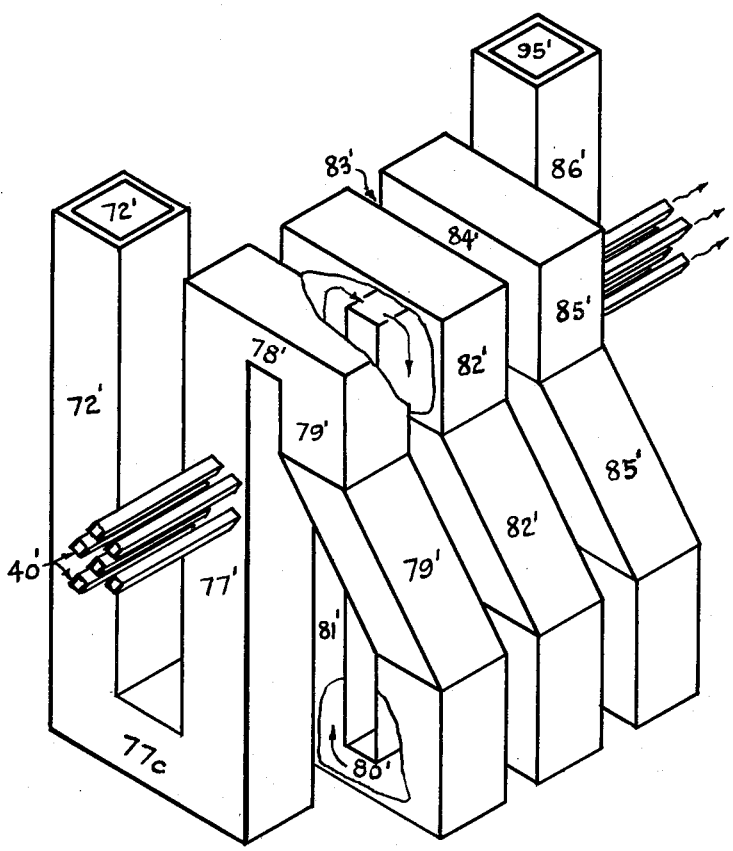
Figure 19 is an isometric view of a simplified gas generator, showing the general relation of the heating tubes and chambers of the processing zone.

In an effort to present more clearly the relation between the hot tubes of the heating zone and the passages whereby the processing zone ingredients are brought into contact with these tubes, a simplified isometric view of one such set of tubes and its attendant processing zone passages is shown in Fig. 19.

In that figure, diagrammatically and merely for the purpose of illustration, is shown a typical section of the system of chambers and passages. These have been somewhat expanded and the wall thicknss minimized in order to more clearly visualize the general relation between the heating tubes and the various ducts an enclosures. As will hereinafter more fully appear "primed,"

reference numerals used in Fig. 19 correspond generally with similar numerals in other figures.

In this structure, there is an initial vertical mixing chamber 72' connected horizontally at its lower end (as at 77c in Fig. 19) to the lower part of another vertical chamber 77', which extends upward, enclosing within its walls a section of horizontal heating tubes 40'. At its upper end the chamber 77' is connected to the top of a second chamber 79' by a horizontal passage 78' perpendicular to the direction of the tubes 40'. Chamber 79' extends vertically downward for a short distance, runs in a downwardly oblique direction parallel to the axes of the tubes for an additional short distance and then runs vertically downward until it reaches the level of the bottom of horizontal chamber 77c. Here it is connected horizontally at its bottom to a chamber 81' by a chamber 80' identical with and parallel to 77c. Chamber 81' extends upward to encompass a second portion of the tubes 40', and is joined at its top by the horizontal duct to the chamber 82' which is similar in shape and parallel to chamber 79'. Chamber 82' is connected horizontally at its bottom to chamber 83'. Chamber 83' extending upwardly encompasses a third portion of the tubes 40' and is joined through chamber 84' to chamber 85' similar and parallel to chambers 82' and 79'. Chamber 85' is connected horizontally at its bottom to the vertical chamber 86'. Chamber 86', extending upward parallel to 77', 81' and 83', terminates at the port 95'.

In Fig. 19, a mixing of the powdered coal, steam and recycled gas takes place in space 72', and the ingredients flow up through chamber 77' passing among the heated tubes 40' which are disposed horizontally through chamber 77'. Clearing these tubes, the stream moves through chamber 78' and down chamber 79', which is unheated, and then horizontally and rearwardly through chamber 80' to emerge in chamber 81'. In chamber 81' the gases rise and again contact the hot tubes 40'. This process is repeated through the subsequent passages and the gaseous product finally emerges from port 95'. The tubes 40' traverse chamber 81' and 83' in the same manner as chamber 77' to which 81' and 83' are similar.

The illustration in Fig. 19 is presented to give a general or diagrammatic picture of my method of handling a suspended powder or gaseous stream. A more complete description follows:

Describing my invention more fully, the novel apparatus when used for the making of fuel gas from carbonaceous products and steam should preferably be in an enclosure built largely of materials capable of retaining their shape and strength at relatively high temperatures. Tubes will be made from refractories, heat resisting alloys or a combination of both. Mechanical feeders, injectors, ejectors and similar devices with minor modifications are available in the open market. In general, the construction of the apparatus and the number of relative size tubes and other elements given for descriptive and illustrative purposes, may be varied by those skilled in the art to conform to generally accepted furnace practice.

Referring to Figs. 1–17, as heretofore stated, my apparatus may in a broad sense be divided into two zones. The first or heating zone, includes two sections, a sensible heat section and a reaction heat section. The sensible heating section comprises primary and secondary combustion chambers 26 and 30 (Fig. 6) and a series of the tube nests such as 40 and chambers such as 41 (Fig. 7) which lead eventually to a mixing chamber 63. The reaction heat section comprises two primary combustion chambers 55 and 55a (Fig. 10), two secondary combustion chambers 61 and 61a (Fig. 10) and ducts 62 and 62a (Fig. 10) which ducts being the hot gases produced in 55, 55a and 61, 61a to chambers 41 and 43 (Fig. 7) where they mix with the hot gases from the sensible heat section. From chamber 41 on through to mixing chamber 63 (Fig. 9), the sensible heat and the reaction heat sections are one and the same.

The second or processing zone comprises initial mixing chamber 72 (Fig. 14) and a system of chambers such as 77 and 78 (Fig. 14) which lead the products to be processed among the hot tubes of the tube nests of the heating zone.

The function of the heating zone is to provide the correct temperature in the hot chambers of the processing zone and to supply heat for the chemical reactions which occur. The function of the processing zone is to provide a means whereby reactants can be subjected to heat, their motion aided by convection and any undesirable solids separated from them.

HEATING ZONE

(a) Sensible heat section

Figure 17:
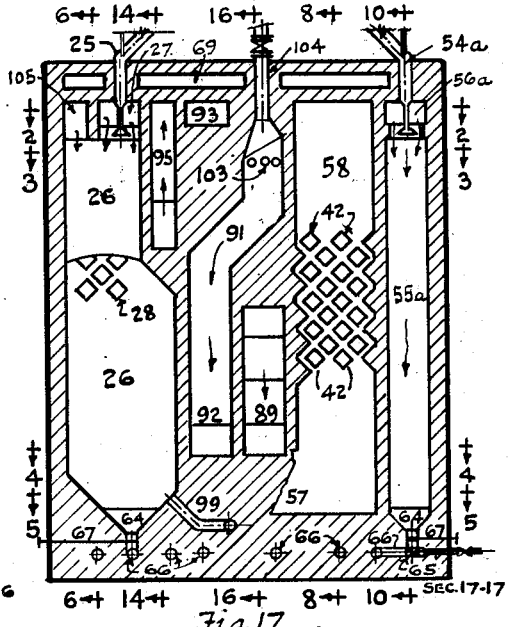

For the supply of heat for the heating zone, fuel, preferably pulverized coal, is delivered in predetermined quantities from a pulverizer and coal storage bin to the burner 25 shown in Figs. 2 and 17. Preheated air enters the combustion chamber 26 through duct 27 connecting with the air preheater 68 through a horizontal duct 70 as shown variously in Figs. 2, 3, 6 and 17. In this chamber 26 combustion will be largely incomplete to give principally carbon monoxide.

Additional heat may also be released, if desired, in space 26 shown in Figs. 3, 6 and 17 by burning therein such incidental coal particles as may be discharged into it from processing zone collecting hoppers as hereinafter described. Also unconsumed carbon discharged into chamber 26 from "burning out" operations as hereinafter-described may be employed in this fashion.

Figure 6:
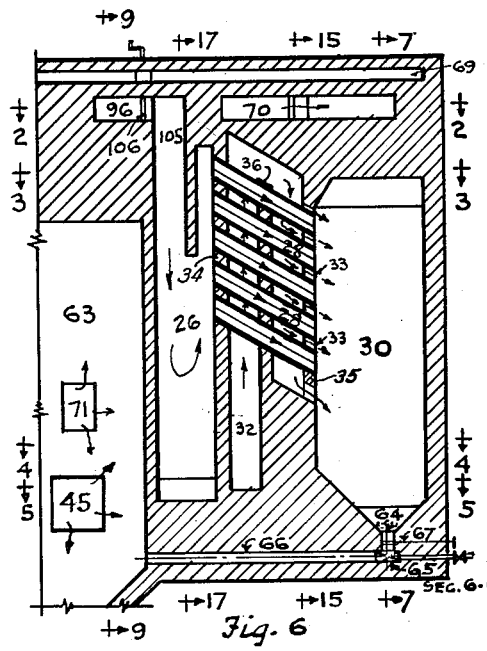
Figure 15:
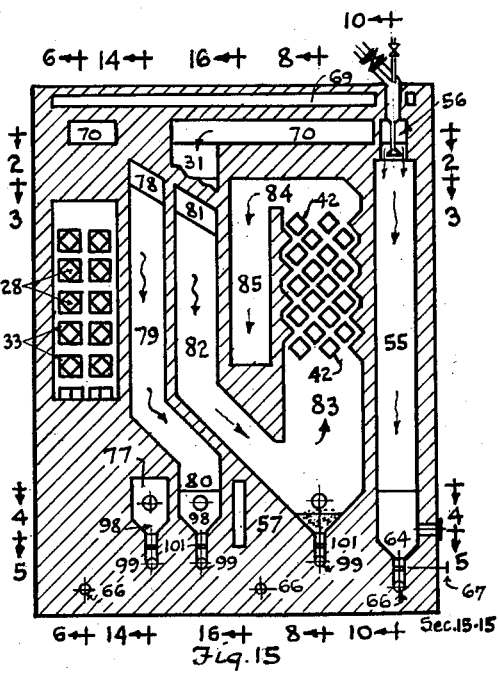
Figure 16:
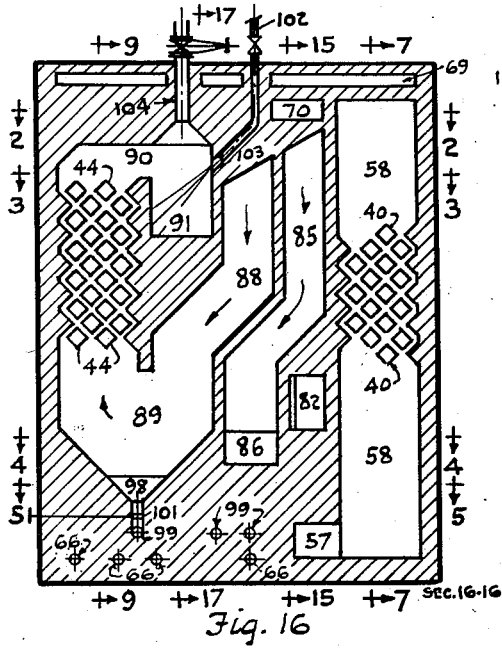

The products of primary combustion produced in space 26 move through tubes 28 into space 30 shown in Fig. 6 (see also Figs. 2 and 17). Additional air to bring about complete secondary combustion of these products in space 30 to give carbon dioxide, is supplied from air preheater 68. This preheated air is led through the horizontal duct 70, down a vertical duct 31 (Fig. 15) where it cools the walls between 31 and adjacent ducts and absorbs heat in passing. It then runs through the horizontal leg of an L-shaped duct 32 (Figs. 5, 6) and rises through the vertical leg around a portion of the heated tubes 28, therein absorbing heat. A wall 36 between the duct 32 and chamber 30 supports the tubes 28 at their mid-portion. The gas rises over the top of the wall 36 and then moves downward among a second portion of the tubes 28, again absorbing heat and finally discharging into the secondary combustion chamber 30. This discharge is accomplished through the triangular ports 33 in the wall 35 of the chamber 30. The ports are formed by fitting the square tubes 28 into the somewhat larger square apertures in the wall 35 so that the cross-sectional diagonals of the tubes are perpendicular to the sides of the apertures as best shown in Fig. 15. The wall 35 thus supports one end of tubes 28; the other ends of these tubes pass through and are supported by the wall 34 of chamber 26, in such manner that the gases from chamber 26 may pass through the tubes to chamber 30. The wall 34 between chambers 26 and 30 is otherwise imperforate.

By properly proportioning fuel, air, heating surfaces and combustion space volumes, there will be produced in space 30 products of combustion at a temperature level well in excess of that demanded by the water gas equilibria and reaction rate considerations.

As previously indicated the gases from chamber 30 pass successively into chambers 41, 43 and 63 through tube nests 40, 42 and 44.

The tubes of the tube nests 40, 42 and 44 are similar in structure. In each nest the tubes which form it extend from an end partition or wall of the chamber (either 30, 41 or 43) to the opposite partition or wall of the next succeeding chamber 41, 43 or 63 as the case may be. These nests and chambers are shown in Figs. 3 and 6–9. The tubes themselves are parallel and are stacked and spaced to form a series of passages between their central portions as shown in Fig. 13.

As shown, the side rows of tubes of the tube nest may be built into the walls and partitions so that each such tube will expose two heated faces. These are substantially at the same temperature level as any one of the interior tube surfaces. Thus the gases pass between heated surfaces at approximately the same temperature, as distinguished from contact with a heated surface at one side and a cooler surface on the other.

The longitudinal axes of the tubes are preferably inclined downwardly in the direction of flow of the products of combustion passing through them to discourage the formation of deposits of coal or ash on their inner surfaces.

The junctions where tubes of nests 40, 42 and 44 meet with the walls are made as tight as possible to prevent leakage from the processing zone to the heating zone or vice versa.

Satisfactory materials from which to make the individual tubes are refractories. These may be based on silicon carbide, aluminum oxide or aluminum silicate; or molybdenum alloys or other heat resistant metals may be used. A type of tube construction which may be used is that shown in Figs. 11 and 12, which illustrate a compound tube having a lining 37 of the refractory materials mentioned with an outer casing 38 made of an alloy having high temperature resisting qualities such as the molybdenum alloys above mentioned. The use of refractory collars 39 at wall junctions will likewise improve strength, tightness and heat conductivity.

In the heating zone, under the influence of suction from stack draft or induced draft fan (not shown), the products of combustion are caused to pass from chamber 30 through tubes 40 and into chamber 41 (Fig. 7), then through tubes 42 to chamber 43 (Fig. 8) and finally through tubes 44 (Fig. 9) into the mixing chamber 63. The passage of the hot gases through these tubes will heat the tube walls and consequently the processing zone in which these tubes are placed. When the quantities of heat supplies are sufficient and the temperature levels are at the high level required for gasification, the proper conditions for making fuel gas will be present in the processing zone.

While it is possible to supply all the heat needed for the entire water gas reaction from the burning of coal in the sensible heating section of the heating zone, i. e. 26–41, such mode of operation would require a large and inconvenient reaction chamber; also the temperature differentials would be great so that more heat would be transferred initially than is preferable. Therefore, it is preferred to use the first part of the heating zone from chamber 26 through chamber 41 as described, to boost the temperature of the reactants up to the required level and then to use a new combustion chamber and fresh fuel for the purpose of transferring at that temperature level the heat of reaction demanded by the endothermic water gas conversion.

(b) *Reaction heat section*

This additional heat transfer is accomplished as follows: Fuel, preferably pulverized coal, is delivered in predetermined quantities from a pulverizer and coal storage bin (not shown) to one or both of the burners 54, 54a shown in Figs. 2, 10, 15 and 17 discharging the fuel into parallel duplicate primary combustion chambers 55, 55a. The burners are of conventional construction, and may be of the sort commonly used in steam boilers, and having compressed air or steam to compel the flow. Air for primary combustion originates in air preheater 68 moving through the horizontal duct 70 to individual vertical ducts 56, 56a shown in Figs. 2 and 10. The products of primary combustion move down through chambers 55 and 55a, through the secondary duplicate combustion chambers 61, 61a.

Figure 7:
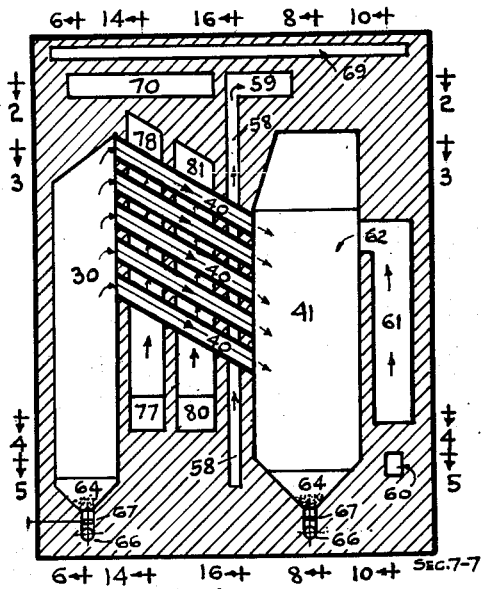
Figure 8:
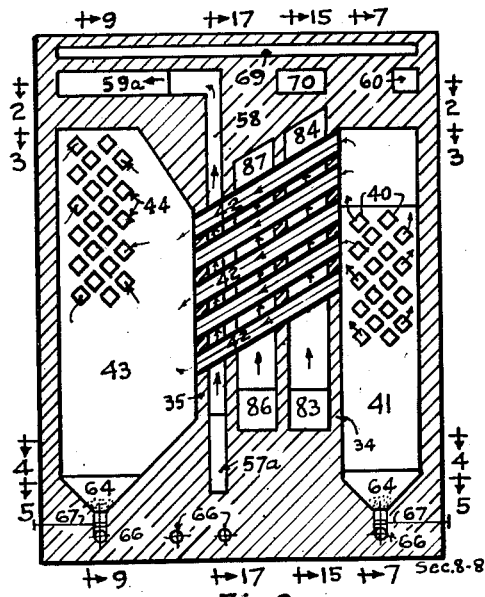

Air for secondary combustion also comes from the preheater 68 and passes through the duct 70 (Fig. 2) to vertical passage 34, through which it moves downwardly to horizontal ducts 57, 57a which branch in different directions as illustrated in Fig. 5 and connect with duplicate vertical ducts 58, 58a (see Figs. 5, 7 and 8). From the top of vertical ducts 58, 58a the high temperature air passes through duplicate horizontal ducts 59, 59a (see Fig. 10) to duplicate vertical ducts 60, 60a and through them downwardly. The ducts 60, 60a at their bottom ends have short lateral extensions connecting with the secondary combustion chambers 61, 61a. Here high temperature carbon dioxide is produced and discharged through duplicate ports 62, 62a into heating zone spaces 41 or 43, adding to the total quantity of heat therein.

The duplicate combustion chambers 61, 61a need not be operated in parallel but each may be operated alone.

The number of tubes and hence the total cross sectional area of each of the tube nests 28, 40, 42 and 44 shown in Figs. 3, 6, 7, 8 and 9 increases as one proceeds from entrance to exit of the apparatus. Such an arrangement serves to compensate for the increased volumes caused by the addition of hot gases from the reaction heat section to the main stream of the heating zone, the object being to maintain velocities of flow through all the tubes substantially constant.

Similarly, the volumes of each of the chambers 30, 41, 43 and 63 shown in Figs. 3 and 6–9 are successively greater toward the exit. Such increased volumes will be sufficiently large to leave a substantial margin over and above that required due to the hot gases from the reaction heat section delivered through ports 62 of Fig. 10, thus slowing down speeds of flow in such chambers.

It is advantageous to slow down the flow when at the same time there is a change in direction of flow because such action causes and facilitates precipitation of suspended ash particles. These ash particles will collect in hoppers 64 at the bottoms of the chambers. When it is desired to remove this ash, the gate valves 67 are opened and simultaneously steam is introduced through ejectors 65 (see Figs. 17 and 5). The ash is caught by the high velocity steam and carried through the tubes 66 into the space 63, whence it can be drained and discarded.

Pheheated air for the heating zone combustion originates in heat exchanger 68 shown in outline on Fig. 2. The heat is supplied by newly formed fuel gas made as described below. The cold air for heat exchanger 68, if it is so desired, may be drawn through spaces 69 shown in Figs. 6–10 and 14–17 thus cooling the top surfaces of the apparatus. After absorbing heat from heat exchanger 68, the air at elevated temperature enters the apparatus through horizontal duct 70 shown in Figs. 2, 6–8, 14–16 and is distributed to burners similar to 54, 54a as shown in Fig. 2, and down through vertical duct 31 as shown in Figs. 2–5 to passages leading to secondary combustion spaces 39 and 41 shown in Figs. 3 and 5–9. The details of construction of heat exchanger 68 are not a part of this invention.

PROCESSING ZONE

The processing zone comprises all those spaces of the gas generator in which the fuel gas ingredients circulate and are processed to form substantially ash free fuel gas.

Figure 14:
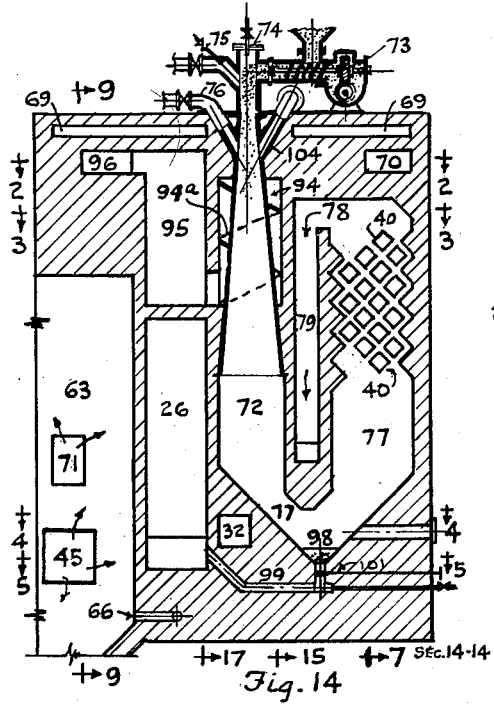

The fuel gas ingredients, consisting of a properly proportioned mixture, according to usual standards, of pulverized coal and steam, are fed into the initial mixing chamber 72 shown in Figs. 2, 3 and 14 and are intimately mixed therein. The feeding device for coal may be a screw conveyor and for the steam may be a regulating and measuring valve of standard construction. The finely divided coal and the steam are discharged into the initial mixing chamber 72. The details of construction of coal and steam measuring devices or coal pulverizers are not parts of this invention.

To aid intimate mixing as well as movement of ingredients a portion of recycled product gas may be injected along with ingredients through a valve 75 (Fig. 14). The speed of flow of this recirculating gas portion provides an effective means for initiating and controlling the speed of flow of the entire contents of the processing zone as the reactants move from entrance to exit.

Figure 9:
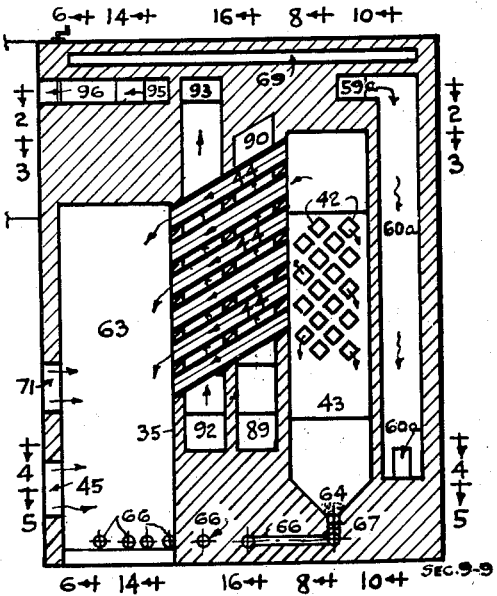

The fuel gas ingredients pass downward in space 72 under the influence of the steam jet and the recycle current, moving into space 77 shown in Figs. 7 and 14. In this space the ingredients are caught on rising convection currents generated in the spaces between the heated tubes of tube nest 40 and move around and in among these tubes coming in intimate contact with their wall surfaces, thus absorbing heat. The rise in temperature of the mixture is extremely rapid because of the high temperature gradient between the mixture and tube walls. On reaching space 78 (Fig. 14) at the top of the tube nest, the mixture moves horizontally into chamber 79. Here the mixture is cooled and falls, moving along the inclined path of chamber 79 (Fig. 15) to chamber 80 (see Figs. 7 and 15 and compare Fig. 19). The stream travels through the horizontal portion or leg of chamber 80 and up the vertical portion or leg through the next following section of tube nest 40 (Fig. 7), where it is again caught on rising convection currents between the heated tubes. Upon reaching the horizontal space 81 at the top of the nest, the mixture moves horizontally into the next part of the system, where it is again cooled by the cooler passage walls and drops down chamber 82 (Fig. 15). It then moves up the vertical chamber 83 through a section of tube nest 42 (Figs. 8, 15), rises among these hot tubes and is carried through horizontal duct 84 to vertical chamber 85 (Figs. 3, 8, 15, 16). It moves down and forward in chamber 85 to the horizontal leg of L-shaped chamber 86 (see Figs. 15, 16, 8) and up the vertical leg of chamber 86 among the spaces between the tubes of tube nest 42 to horizontal duct 87 shown in Fig. 8. From here it moves down through the vertical chamber 88 to chamber 89 rising through its vertical leg among a section of tubes 44, up to horizontal duct 90 shown in Figs. 9 and 16. Thence it proceeds down vertical chamber 91 (Fig. 17) to the horizontal leg of an L-shaped chamber 92. It proceeds up the vertical leg of chamber 92 through a portion of tube nest 4 as shown in Figs. 9 and 3 moving up among the second section of tubes 44 to passage 93; and from passage 93 it goes to preheater 94, shown in Fig. 2.

These successive steps among heated tubes and cooler following chambers may be repeated as many times as desired. A continuous circuitous path is thus provided in which initial heating, gasification and ash precipitation is effected.

Ash precipitation

Ash representing inert elements of the fuel is formed as a residue from the above gas reaction and travels along with the newly made fuel gas and unprocessed ingredients. Much of this ash is progressively precipitated, collected and ejected.

Although the pulverized coal for processing will generally be too finely divided to be separated from suspension as described above, incidental coarse or combinations of coagulated fines may be thrown out of suspension in the apparatus already described by the combined action of gravity, reduced speed of flow and curvature of path before their gasification is effected. In that event they will be collected along with the precipitated ash in hoppers 98 shown in Figs. 4 and 14–17.

To prevent the loss of fuel value from such separated coal particles, they are collected and introduced into the heating zone where they are completely burned. To accomplish this, the hoppers 98 are provided with gate valves 101. When these are opened the precipitated particles drop and are caught by the swiftly moving steam introduced through the ejectors 100 and are carried through tubes 99 to the initial mixing chamber 26 of the heating zone. Here the coal will burn while ash may be carried along by combustion gases for later precipitation.

Separation of fly ash

In addition to the above, consideration must be given to the finely divided or excessively lightweight fly ash which resists precipitation in the manner described above. Such lightweight material can be largely removed from suspension by one or more oil sprays 103 (Figs. 2, 16, 17) placed in the path of the moving stream of processing zone contents. This serves also as a means for furnishing carburetting hydrocarbons.

The carburetting oil for the oil spray is fed into the duct 91 from a fuel oil source (not shown) through valved pipes 102 discharging in either an atomized or vaporized form. With properly arranged direction of flow and manner of distributing the oil discharge, a screen is provided by the spray as shown through which the fly-ash laden fuel gas must pass to the exit. Much of the lightweight ash will be caught in this oil screen and either deposited on the duct surfaces or precipitated and collected as coagulated coal particles in hopper 98 under duct 91 and space 92 shown in Figs. 4, 9 and 17, then ejected through valve 101 and tube 99 to space 26 shown in Figs. 4 and 17 for recovery of any available fuel value.

The last partitioned portion of tube nest 44 shown in Figs. 2, 3 and 9 serves, if it is so desired, as a means for the superheating of the carburetted fuel gas fixing same to a stable gas having substantially permanent characteristics. The carburetting and superheating feature described above is optional, my invention delivering, if desired, uncarburetted fuel gas, the flyash being partially removed in mechanically operated dust collector 97 shown in outline on Fig. 2. The construction details of this dust collector are not part of my invention.

*Cleaning*

When as a result of carburetting or from the use of certain grades and qualities of coal, the coal particles themselves or their derivatives adhere to and build up deposits on the processing zone surfaces which would in time reduce the efficiency of the apparatus, it is not necessary to scrape or employ other mechanical methods for their removal which could injure surfaces and tubes.

Instead, coal or the deposits themselves, or both are burned in the processing zone's circuitous path, valved inlet ducts for air 104 shown in Figs. 2, 14, 16 and 17 furnishing the necessary air for combustion; and additional fuel if necessary being supplied by the coal feeding device 73 shown in Fig. 14. Valved inlet 76 may also be used for the admission of air. During normal fuel gas generating operations valves 104 are closed.

The products of incomplete combustion produced as a result of "burning out" operations are disposed of without loss of their calorific value by effecting their passage from the processing zone rising from tube nest portion 44 through ducts 93, 95 and 96 shown in Figs. 2, 3, 6, 9, 14 and 17 through duct 105 by the proper operation of valve 106 into the primary combustion chamber 26 of the heating zone (Fig. 6). In this space available fuel value will be captured by completion of combustion to carbon dioxide and discharged into elements of heating zone. Under normal fuel gas generation, valve 106 is closed.

As a means for increasing thermal efficiency, part of the sensible heat from the newly made fuel gas is transferred to the cold processing zone ingredients as they enter the mixing chamber 72. This is accomplished by leading the hot newly produced gas from vertical chamber 92 (Fig. 9) through the horizontal duct 93 (Fig. 2) into the spiral passage 94 (Fig. 14) which is fitted around the conical section of the initial mixing chamber 72. This spiral passage 94 may be formed by a wall 94a which spirals downwardly from the entrance at the top, around the outside of the conical upper part of the mixing chamber 72. As the hot gases swirl through the passage 94, they lose heat to the relatively cold mixture of coal, steam and recycle gas entering chamber 72. Considerable quantities of heat will be transferred through the walls of chamber 72 to the fuel gas ingredients, thus effecting a rise in their temperature at a point in the process where such a rise is most useful.

From the spiral passage 94, the fuel gas moves up the vertical duct 95 (Fig. 14) and through the horizontal duct 96 (Fig. 2) to the heat exchanger 68 (Fig. 2) where it is used to preheat air for use in the combustion chambers of the heating zone.

To recapitulate, there will issue from the two principal parts of the apparatus two gaseous streams differing in character:

1. From the heating zone there will issue a continuous flow of products of combustion from the tubes of tube nest 44 discharging into mixing chamber 63 as shown in Figs. 3 and 9. The temperature level of these hot gases is in the neighborhood of the temperature at which the fuel gas reaction takes place.

2. From the processing zone there will issue a continuous flow of hot fuel gas coming directly from the heat exchanger 68 or from valved tube 51 connected with the ash separator.

The quantities of sensible heat carried out of the apparatus as above, represent a substantial portion of the total heat expenditure. Therefore, the degree of heat recovery effected from these two heat sources is a very real measure of the thermal efficiency and commercial value of this invention.

THE STEAM BOILER COMBINATION

Fig. 25 shows an arrangement whereby the hot products of combustion issuing from the heating zone of my apparatus may be utilized in cooperation with a standard steam boiler installation, thus saving much of the heat which would otherwise be wasted.

The installation shown in Fig. 25 is designed to take the hot gases generated in a steam boiler combustion chamber and after allowing them to pass through one section of the boiler tubes, to direct them into a mixing chamber where they can be thoroughly blended with the higher temperature gases coming from the heating zone of my apparatus; the combined gases then returning to the boiler complete the heating of the rest of the boiler tubes.

As shown in Fig. 25, hot gases are generated in boiler combustion chamber 200. They then move upward and pass among the tubes of the superheater 205. Thence they are drawn down duct 201 passing through port 45a into mixing chamber 63a. Here they mingle with the hot gases issuing from the tubes of tube nest 44. The combined volumes pass out through port 49a and travel up among the remainder of the boiler tubes 202 and out through the exhaust port 204. The quantity of boiler gases which pass through superheater 205 is controlled by valve 203.

THE GAS TURBINE COMBINATION

The newly made fuel gas issuing from the processing zone after having done its work of preheating combustion air in heat exchanger 68 with or without treatment in a mechanical dust separator 97 (Fig. 2) may, if desired, be piped directly to a manufactured gas plant for further processing to a standard manufactured gas. However, a desirable alternative use to which this substantially ashfree fuel gas may be put, is to burn it in a gas turbine installation also shown diagrammatically in Fig. 18. The fuel gas is delivered to a gas compressor 48 from which it is injected at an elevated pressure to the gas turbine combustion chamber 53 through injector 47 through fuel gas line 51, shown also in Fig. 2. Gas compressor 48, may be bypassed as for repairs by means of valves 160 and 161. Along with it goes compressed air from air compressor 52 driven by the turbine 59 whose rotation is effected by the expansion of gases generated in combustion chamber 53. This combustion air for the gas turbine may be preheated by placing heat exchanger 46 in mixing chamber 63. When preheating is desired valve 151 is closed and valve 152 is opened. Heat recovery from its exhaust may be effected by discharging same into space 63. Little or no backpressure will act on the gas turbine because mixing chamber 63 is of relatively large volume.

When gas generator, gas turbine and boiler exit and reinjection points 45 and 49 are arranged as integral and interconnected units as shown diagrammatically in Fig. 18 and further, when the gas compressor 48 is provided with variable speed driving mechanism, an effective means for the control of speed of flow of gas generator processing zone contents is available, the variable suction effect of the gas compressor 48 being transmitted back to the processing zone. By the provision of means for the control of pressure and quantity of air delivered by air compressor 48 to fuel gas injector 47 the rate of flow of the fuel gas may be controlled within relatively wide limits. This controllable suction effect will impose an equivalent variable rate of flow on the contents of the processing zone all the way back to initial mixing chamber 72 (Fig. 14).

ADVANTAGES

Considering the manner of generating the substantially ashfree fuel gas as described above, including carburetting and superheating it if desired, it will be evident that a new method of fuel gas generation is involved apart from any particular structure in which the fuel gas may be made, treated, used, or subjected to methods and means for heat recovery. Since heat for processing is added as fast as it is absorbed in raising temperatures of ingredients and bringing about the fuel gas reaction, the process is continuous. Among a number of other advantages are:

Low cost of operation, efficient use of fuel both for the process and heat supply so that a maximum of available energy is utilized, improved heating of ingredients and the precipitation, collection and ejection of ash is accomplished. Moreover, the described embodiment of my invention requires for the most part only standard equipment and materials readily obtained in the market and is easily built. Once the process is begun there need be no interruption for a considerable time. The deliveries of the various feeders and the air supply may be accurately predetermined after tests, and once the apparatus is set little attention will be necessary. For variable product demands, interconnecting control mechanisms are available in the open market.

COUNTERFLOW

Regarding the relative directions of the streams in the heating zone and the processing zone, a parallel flow apparatus is illustrated by drawings of Figs. 1–10 and 14–17. However, the apparatus can be designed to operate on the principle of counterflow, particularly when used as a gas generator. By this I mean that the fresh relatively cool ingredients entering the processing zone are heated by the gases of the heating zone at a point just before these latter pass out of the system, and as the processing zone ingredients grow progressively hotter, they encounter hotter portions of the heating zone. This is practicable, and has certain advantages in that the fuel gas leaving the furnace is subjected to the highest heat, thus effecting the reaction of any unconverted solids and the fresh cool ingredients entering the furnace still extract the maximum heat from the somewhat cooled gases of the heating zone. Examples of apparatus operating on the principle of counterflow are shown in Figs. 20–23 described below. Methods and structural elements disclosed above in connection with parallel flow, in general apply equally well to the apparatus operating in counterflow, which I will now describe.

Products of combustion of fuel or other hot gases enter the heating zone through port 107 shown in Fig. 20 passing under a vertical baffle 108 normal to the general direction of flow, and then through tubes 109 to chamber 110. From chamber 110 the gases pass under a vertical baffle 108a (perpendicular to baffle 108) to tubes 111 and enter chamber 112; from chamber 112 the gases go under baffle 108b (perpendicular to baffle 108a) to and through tubes 113 to disposal chamber 114. Valve or door 115 controls access to space 116 for mixing the products of zones when desired as hereinafter described. When such mixing is not desired the valve 115 will be closed and discharge from the apparatus is through port 117. Due to passage of hot gases through tubes of tube nests 109, 111 and 113 shown also in Figs. 21, 22 and 23, the tube walls are heated. Thus the gases being processed in the processing zone, as they pass among these heated tubes, are supplied with the heat necessary for the chemical reaction to be effected.

Ingredients to be processed are delivered to the processing zone through feeder 120 into an initial mixing chamber 121. In that chamber additional ingredients may be mixed in, said ingredients entering through valved openings 136, 137 and 138 shown in Fig. 23 adjacent the feeder 120.

Figure 21:
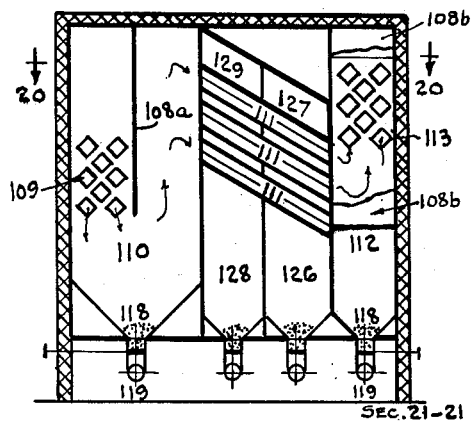
Figure 21 is a vertical sectional view of a counterflow apparatus taken on line 21—21 of Fig. 20 showing path traveled by products of combustion or other heated gases in a part of the heating zone.

The ingredients move downwardly and on reaching the bottom of space 121 the ingredients move through the horizontal leg of an L-shaped chamber 122 and rise through the vertical leg, passing among the first portion of tube nest 113 shown in Figs. 21 and 22. This tube nest is divided in two parts by a vertical partition 113p in its middle. In this first portion the gases absorb heat from the heated tube walls as described in detail above.

Upon reaching the top of the first section of tube nest 113, the gases move horizontally over into passage 123. Passage 123 is shaped similarly to passage 79'—80' shown in Fig. 19, and connects with the bottom of a passage leading up among the second section of the tube nest 113. Thus the gases can pass down passage 123 and thence up through the second portion of tube nests 113 and horizontally into another passage 125. Passage 125 is similar to passage 82' of Fig. 19 and connects at its bottom with passage 126 (Figs. 21 and 22). Thus the gases move down passage 125 and horizontally over through passage 126 (Fig. 22) and are then able to move up among the first portion of the second tube nest 111 to emerge in the chamber 127. The structure of the passages 127—131 inclusive is identical with that of passages 123—127 just described. The gases move downwardly through chamber 127 which is shaped like passage 79' of Fig. 19, horizontally through passage 128 and up through the second part of tube nest 111 and then horizontally into chamber 129 (Figs. 21 and 22). Thence they pass down chamber 129 and horizontally through passage 130 and up through the first part of the third tube nest 109 and horizontally over into passage 131. Passage 131 is also shaped like 79'—80' of Fig. 19. Hence the gases pass down through 131, then horizontally under the second portion of the tube nest 109, and finally up through that tube nest to emerge into passage 133 and pass out into chamber 116. Here, if so desired, they may be mixed with the products of the heating zone emerging through the gate valve 115. If mixing of the products of the two zones is not desired, valve 115 will remain closed.

The functions of the downward ducts and partitioned tube nest portions are the same as described above in connection with the parallel flow apparatus. Hoppers 118 and 134 (Figs. 21, 22) together with valved tubes 119 and 135 (Fig. 23) collect and permit discharging of precipitated solid particles preferably using a steam ejector, all in a manner similar to that described above.

OTHER USES

Uses of my invention other than for the generation of substantially ashfree fuel gas from carbonaceous products and steam will be apparent to those interested in the various arts to which my invention applies.

For example, my invention can be used for the removal of dust content of blast furnace and coke oven gases (while, if desired, making a useful blast furnace-coke oven fuel gas mixture), the treatment of low grade and residual petroleum oils to eliminate sludge and other industrial processes.

For such applications of my invention, similar apparatus to that described above for the making of fuel gas may be used; in fact, the same apparatus may be put to use for a number of different applications in succession.

BLAST FURNACE AND COKE OVEN GAS

Several different gaseous substances may be processed simultaneously through my apparatus. For example, blast furnace gas and coke oven gas, both products of operations in the making of iron and steel may be simultaneously treated. A valuable mixed gas, relatively free from the high dust content of the individual components may be produced by causing one gas to pass through the circuitous path of the processing zone, and the other to pass through the heating zone. The dust content of both the processed gases will be substantially reduced by the precipitation of the dust into spaces such as 108 and 130 shown in Figs. 21 and 22, the dust being collected in hoppers 118 and 134 and ejected through tubes 135 and 119 all as described above.

A considerable degree of equalization of temperatures will occur during the simultaneous processing of the two fuel gases. In practice the hottest gas will be passed through the heating zone to aid in setting up the rising convection currents in the diagonally intersecting spaces between the interiorly heated tubes. These currents, as explained above, aid materially in the movement of contents of the processing zone from entrance to exit.

A valuable clean fuel gas mixture of blast furnace gas and coke oven gas is thus obtained at low operating cost.

Many modifications within the scope of my invention will occur to those skilled in the art. Therefore I do not limit my invention to the specific embodiments described herein.

What is claimed is:

1. In the process for treating a fluidized powder stream, the steps in separating solid particles from the stream which comprise passing the stream upwardly in a confined passage, applying heat to said stream during its upward movement, then passing said stream downwardly through a confined passage which is cooler than said first passage, the decrease in velocity of the stream effecting separation of solid particles from the stream, and collecting solid particles at the bottom of said cooler passage.

2. The process as claimed in claim 1 having in addition the steps of burning said collected particles, and using heat therefrom for heating said upward passes of the stream.

3. In a process for treating gaseous and fluidized powder streams a method for inducing said streams to flow and for removing solid particles from said streams which comprises passing said streams serially through connected passages, in which said streams are passed upwardly through a heated passage and heated therein, and then downwardly through a cooler passage and then again passed upwardly in a second heated passage to effect suction of the hot gases through the units and to effect separation of solid particles from said gases by the combined effect of reversal of direction of flow and change of velocity of the streams.

4. For use in the treatment of fluidized powder streams, an apparatus for the separation of solid particles comprising a plurality of parallel internally heated tubes, a first vertical chamber enclosing a portion of each of said tubes, a second chamber removed from said heated tubes joined at its top by a connecting passage to the first heated chamber, and a third chamber enclosing a second portion of each of said internally heated tubes and connected at its bottom to the second unheated chamber, and means at the bottom of said second chamber for collecting solid particles.

5. In the process for treating a fluidized powder stream, the steps in separating solid particles from the stream which comprise passing the stream in a confined passage serially upwardly and then downwardly a plurality of times, applying heat from a common source in each upward pass to cause the upward passes to be hotter than the downward passes, said cooler passes effecting separation of solid particles from the stream by the combined effects of abrupt reversal of direction and decrease in velocity of the stream, and collecting the solid particles at the bottom of each downward cooler passage and discharging the particles.

6. In the process for treating a fluidized powder stream, the steps in separating solid particles from the stream which comprise passing the stream in a confined passage serially upwardly and then downwardly a plurality of times, applying heat from a common source in each upward pass to cause the upward passes to be hotter than the downward passes, said cooler passes effecting separation of solid particles from the stream by the combined effect of abrupt change of direction and decrease of velocity, and collecting the solid particles at the bottom of each downward cooler passage, and discharging the particles, the last pass being upward with the addition of heat.

7. A method for removing entrained particles from the colder of two hot, fluidized powder streams of unequal temperatures which comprises leading the colder stream through a plurality of connected units, in each of which units the colder stream is led first upwardly through a heated chamber and then downwardly through a cooler chamber and leading the hotter stream through heat-transfer means adapted to heat the heated chamber in each of said units, the reversal of direction of flow as said colder stream moves from a cooler chamber to a heated chamber and the decrease in velocity of the stream in the cooler chamber causing a portion of the entrained dust to precipitate from said colder stream.

8. An apparatus for processing gaseous and fluidized powder reactant streams comprising a heating enclosure for generating a moving stream of hot gaseous products of combustion and a processing enclosure for subjecting the gaseous and fluidized powder stream to be processed to the heat developed in said heating enclosure, said heating enclosure including a combustion chamber, means for charging fuel to said combustion chamber, a disposal chamber and connecting means, comprising a plurality of tubes joining said combustion chamber to said disposal chamber whereby hot gaseous matter originating from the combustion of fuel in said combustion chamber may be carried through said connecting tubes, heating said connecting tubes, and passed to said disposal chamber, and said processing enclosure including a mixing chamber for mixing reactants to be processed and at least one processing unit, said unit comprising a first chamber and a second chamber, said first chamber being connected at its top to the top of the second chamber, said first chamber enclosing a portion of the heated tubes of the heating enclosure to add heat to said first chamber and said second chamber being removed from said tubes and cooler than the gases coming from said first chamber, and means connecting the bottom of said mixing chamber to the bottom of said first chamber, said heated tubes in said first chamber being above the connection of said first chamber with said mixing chamber, whereby the reactants mixed in said mixing chamber are caused to flow by thermosyphonic forces generated in said units past the tubes of said heating enclosure and are thereby raised to reaction temperature.

9. An apparatus as in claim 8 having means to collect precipitated solids from the reactant stream comprising hoppers formed in the lower portions of those chambers in the processing enclosure in which the stream flows downwardly.

10. An apparatus as in claim 8 wherein said tubes are inclined from the horizontal to facilitate the shedding of solid particles deposited on the interior and exterior surfaces of the tubes and to increase the effective heating surface in the first chamber of the processing enclosure.

11. An apparatus as in claim 8, wherein the means connecting the combustion and disposal chambers comprises a plurality of chambers, said plurality of chambers being connected to each other serially by said tubes arranged in tube nests, and the first of said plurality of chambers being connected to the combustion chamber, and the last to the disposal chamber by tube nests, and wherein there are a plurality of processing units and the heated chamber of each of said processing units encloses a portion of one of said tube nests.

12. An apparatus as in claim 8, wherein the first heated chamber of the processing enclosure after the mixing chamber encloses that portion of the tubes of the heating enclosure nearest the disposal chamber whereby the direction of flow in the processing enclosure is made countercurrent to the direction of flow in the heating enclosure.

13. An apparatus as claimed in claim 8 wherein the processing enclosure includes a terminal chamber connecting at its bottom with the second chamber of the processing unit and enclosing a portion of the heated tubes of the heating enclosure, whereby the reactant stream emerging from said second chamber is caused to flow upwardly through said terminal chamber.

14. An apparatus as claimed in claim 8 wherein the heating enclosure comprises a first combustion chamber, a disposal chamber and a plurality of intermediate chambers arranged in series and connected by tubular connecting means, said first combustion chamber being connected with the first of said series of intermediate chambers by tubular connecting means and said disposal chamber being connected with the last of said series of intermediate chambers by tubular connecting means, and wherein the heating enclosure also comprises a second combustion chamber connected by tubular connecting means with an intermediate chamber other than the one with which said first combustion chamber is connected, whereby hot gaseous products of combustion produced in said second combustion chamber may be added to the material originating in said first combustion chamber to compensate for heat absorbed from said material.

15. An apparatus as in claim 8 and including a steam boiler wherein the disposal chamber of the heating enclosure is the combustion chamber of said steam boiler whereby gases from said heating enclosure may be used for heating the steam boiler.

16. An apparatus for processing gaseous and fluidized powder reactant streams, comprising a heating enclosure for generating a moving stream of hot gaseous products of combustion and a processing enclosure for subjecting the gaseous and fluidized powder stream to be processed to the heat developed in said heating enclosure, said heating enclosure including a primary combustion compartment, a secondary combustion compartment, means for charging fuel to said primary combustion compartment, means for supplying air to said secondary combustion compartment, a plurality of tubes connecting said primary combustion compartment with said secondary combustion compartment, a disposal chamber and means comprising a plurality of tubes connecting said secondary combustion compartment with said disposal chamber whereby fuel may be partly burned in said primary combustion compartment, the hot products of primary combustion carried to said secondary combustion compartment for the completion of burning, and the hot products of combustion carried from said secondary combustion compartment to said disposal chamber, and said processing enclosure including a mixing chamber for mixing reactants to be processed and at least one processing unit, said unit comprising a first chamber and a second chamber, said first chamber being connected at its top to the top of the second chamber, said first chamber enclosing the tubes connecting said primary combustion compartment with said secondary combustion compartment to add heat to said first chamber, and said second chamber being removed from said tubes and cooler than the gases coming from said first chamber, and means connecting the bottom of said mixing chamber to the bottom of said first chamber, said heated tubes in said first chamber being above the connection of said first chamber with said mixing chamber, whereby the reactants mixed in said mixing chamber are caused to flow by thermo-syphonic forces generated in said unit past the tubes joining said primary combustion compartment to said secondary combustion compartment, and are thereby raised in temperature.

CARSTEN INGEMAN JOHNSEN.

References Cited in the file of this patent

UNITED STATES PATENTS

| Number | Name | Date |
|---|---|---|
| 1,055,359 | Rummler | Mar. 11, 1913 |
| 1,496,757 | Lewis et al. | June 3, 1924 |
| 1,616,409 | Bird | Feb. 1, 1927 |
| 1,755,373 | Soderlund et al. | Apr. 22, 1930 |
| 1,799,858 | Miller | Apr. 7, 1931 |
| 1,821,842 | Long | Sept. 1, 1931 |
| 1,941,809 | McKee | Jan. 2, 1934 |
| 1,984,380 | Odell | Dec. 18, 1934 |
| 2,081,406 | Mozza | May 25, 1937 |
| 2,113,774 | Schmafeldt | Apr. 12, 1938 |
| 2,268,134 | Clusius | Dec. 30, 1941 |
| 2,311,140 | Totzek et al. | Feb. 16, 1943 |
| 2,451,804 | Campbell et al. | Oct. 19, 1948 |
| 2,461,021 | Atwell | Feb. 8, 1949 |
| 2,478,295 | Marecaux | Aug. 9, 1949 |

FOREIGN PATENTS

| Number | Country | Date |
|---|---|---|
| 156,257 | Great Britain | July 21, 1921 |

OTHER REFERENCES

Publication, Bourcoud, "Chemical and Metallurgical Engineering," vol. 24, No. 14, pages 600–604 (1921).